US011506820B2

United States Patent
Byun et al.

(10) Patent No.: US 11,506,820 B2
(45) Date of Patent: Nov. 22, 2022

(54) ANTI-REFLECTIVE FILM, POLARIZING PLATE, AND DISPLAY APPARATUS

(71) Applicant: LG CHEM, LTD., Seoul (KR)

(72) Inventors: Jinseok Byun, Daejeon (KR); Kwangseok Seo, Daejeon (KR); Jung Hyun Seo, Daejeon (KR); Yeongrae Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 33 days.

(21) Appl. No.: 16/756,340

(22) PCT Filed: Jan. 15, 2019

(86) PCT No.: PCT/KR2019/000601
§ 371 (c)(1),
(2) Date: Apr. 15, 2020

(87) PCT Pub. No.: WO2019/146948
PCT Pub. Date: Aug. 1, 2019

(65) Prior Publication Data
US 2020/0284948 A1    Sep. 10, 2020

(30) Foreign Application Priority Data
Jan. 24, 2018 (KR) .......... 10-2018-0009001

(51) Int. Cl.
*G02B 1/111* (2015.01)
*G02B 1/14* (2015.01)

(52) U.S. Cl.
CPC ........... *G02B 1/111* (2013.01); *G02B 1/14* (2015.01)

(58) Field of Classification Search
CPC .......... G02B 1/00–1/18; C09D 133/00–133/26
See application file for complete search history.

(56) References Cited

U.S. PATENT DOCUMENTS

| | | | |
|---|---|---|---|
| 9,493,620 B2 | 11/2016 | Okano et al. | |
| 2005/0106333 A1 | 5/2005 | Lehmann et al. | |
| 2006/0147724 A1 | 7/2006 | Mizuno | |
| 2006/0147729 A1 | 7/2006 | Mizuno | |
| 2007/0092730 A1 | 4/2007 | Inakura et al. | |
| 2007/0268587 A1* | 11/2007 | Ninomiya | G02B 1/105 359/601 |
| 2010/0021694 A1* | 1/2010 | Wakizaka | G02B 1/111 428/172 |
| 2010/0067109 A1* | 3/2010 | Horio | G02B 1/111 359/485.01 |
| 2011/0318567 A1 | 12/2011 | Hildenbrand et al. | |
| 2013/0084442 A1 | 4/2013 | Akutagawa et al. | |
| 2013/0090403 A1 | 4/2013 | Jung et al. | |
| 2013/0265529 A1 | 10/2013 | Wakizaka et al. | |
| 2014/0133033 A1 | 5/2014 | Shim et al. | |
| 2016/0187540 A2 | 6/2016 | Akutagawa et al. | |
| 2016/0304722 A1* | 10/2016 | Kobori | G02B 1/118 |
| 2017/0123108 A1 | 5/2017 | Kobori et al. | |
| 2017/0131439 A1 | 5/2017 | Kobori et al. | |
| 2018/0217297 A1 | 8/2018 | Kim et al. | |
| 2018/0231688 A1 | 8/2018 | Byun et al. | |
| 2018/0231690 A1 | 8/2018 | Byun et al. | |
| 2018/0313978 A1 | 11/2018 | Chang et al. | |
| 2018/0364396 A1 | 12/2018 | Jang et al. | |
| 2019/0011602 A1 | 1/2019 | Kim et al. | |

FOREIGN PATENT DOCUMENTS

| | | |
|---|---|---|
| CN | 1955762 A | 5/2007 |
| CN | 102985500 A | 3/2013 |
| CN | 103460079 A | 12/2013 |
| CN | 106662672 A | 5/2017 |
| CN | 106662691 A | 5/2017 |
| CN | 107003562 A | 8/2017 |
| CN | 107360718 A | 11/2017 |
| CN | 107850692 A | 3/2018 |
| CN | 107850693 A | 3/2018 |
| EP | 3163336 A1 | 5/2017 |
| EP | 3299851 A1 | 3/2018 |
| EP | 3316008 A1 | 5/2018 |
| EP | 3733745 A1 | 11/2020 |
| JP | 2007-114699 A | 5/2007 |
| JP | 2008-089969 A | 4/2008 |
| JP | 2008-107792 A | 5/2008 |
| JP | 2008-527076 A | 7/2008 |
| JP | 2009-035594 A | 2/2009 |
| JP | 2009-086360 A | 4/2009 |
| JP | 2010-025996 A | 2/2010 |
| JP | 2012-234170 A | 11/2012 |
| JP | 2013-075285 A | 4/2013 |
| JP | 2013-076786 A | 4/2013 |
| JP | 2014-006447 A | 1/2014 |
| JP | 2014-059368 A | 4/2014 |
| JP | 2014-064477 A | 4/2014 |
| JP | 5771967 B2 | 9/2015 |
| JP | 2015-225129 A | 12/2015 |
| JP | 2016-155992 A | 9/2016 |

(Continued)

OTHER PUBLICATIONS

Machine translation of JP2009086360. Retrieved Sep. 17, 2021.*

(Continued)

*Primary Examiner* — Prashant J Khatri

(74) *Attorney, Agent, or Firm* — Rothwell, Figg, Ernst & Manbeck, P.C.

(57) ABSTRACT

The present invention relates to an anti-reflective film including: a hard coating layer; and a low refractive index layer containing a binder resin containing a copolymer of a polyfunctional (meth)acrylate-based monomer, and inorganic particles dispersed in the binder resin, wherein the polyfunctional (meth)acrylate-based monomer includes a 2- to 4-functional (meth)acrylate-based monomer and a 5- to 6-functional (meth)acrylate-based monomer in a weight ratio of 9:1 to 6:4, and a polarizing plate and a display apparatus using the same.

13 Claims, No Drawings

(56) References Cited

FOREIGN PATENT DOCUMENTS

| | | |
|---|---|---|
| JP | 6011527 B2 | 10/2016 |
| JP | 2017-016153 A | 1/2017 |
| JP | 2018-524641 A | 8/2018 |
| JP | 2018-530007 A | 10/2018 |
| KR | 10-2006-0031941 A | 4/2006 |
| KR | 10-0710961 B1 | 4/2007 |
| KR | 10-2009-0044089 A | 5/2009 |
| KR | 10-2011-0052656 A | 5/2011 |
| KR | 10-2012-0007461 A | 1/2012 |
| KR | 10-2013-0010330 A | 1/2013 |
| KR | 10-2013-0120223 A | 11/2013 |
| KR | 10-2014-0006922 A | 1/2014 |
| KR | 10-2016-0002409 A | 1/2016 |
| KR | 10-2016-0072329 A | 6/2016 |
| KR | 10-2017-0031640 A | 3/2017 |
| KR | 10-2017-0065459 A | 6/2017 |
| KR | 10-2017-0070278 A | 6/2017 |
| KR | 10-2017-0082918 A | 7/2017 |
| KR | 10-2017-0086477 A | 7/2017 |
| KR | 10-2017-0103685 A | 9/2017 |
| KR | 10-2017-0106231 A | 9/2017 |
| KR | 10-2017-0141169 A | 12/2017 |
| TW | 201213429 A | 4/2012 |
| TW | 201605955 A | 2/2016 |
| WO | 2012-147527 A1 | 11/2012 |
| WO | 2016-084729 A1 | 6/2016 |
| WO | 2017-043948 A1 | 3/2017 |
| WO | 2017-078428 A1 | 5/2017 |
| WO | 2017-095206 A1 | 6/2017 |
| WO | 2017-155335 A1 | 9/2017 |
| WO | 2017-155338 A1 | 9/2017 |

OTHER PUBLICATIONS

Extended European Search Report issued for corresponding European Patent Application No. 19744347.6 dated Sep. 14, 2020, 9 pages.
Search Report & Written Opinion issued for International Application No. PCT/KR2019/000601 dated Apr. 22, 2019, 12 pages.
Search Report & Written Opinion issued for International Application No. PCT/KR2019/000602 dated Apr. 22, 2019, 14 pages.
Extended European Search Report dated Dec. 14, 2020, of the corresponding European Patent Application No. 19744437.5, 9 pages.

* cited by examiner

ANTI-REFLECTIVE FILM, POLARIZING PLATE, AND DISPLAY APPARATUS

CROSS-REFERENCE TO RELATED APPLICATION(S)

This application is a 35 U.S.C. § 371 National Phase Entry Application from PCT/KR2019/000601, filed on Jan. 15, 2019, and designating the United States, which claims the benefits of the filing date of Korean Patent Application No. 10-2018-0009001 filed with the Korean Intellectual Property Office on Jan. 24, 2018, the entire disclosures of which are incorporated herein by reference.

FIELD OF THE INVENTION

The present invention relates to an anti-reflective film, a polarizing plate, and a display apparatus.

BACKGROUND OF THE INVENTION

In general, a flat panel display device such as a PDP or an LCD is equipped with an anti-reflective film for minimizing the reflection of light incident from the outside. As methods for minimizing the reflection of light, a method (anti-glare: AG coating) in which a filler such as inorganic fine particles are dispersed in a resin and coated onto a substrate film to impart irregularities; a method (anti-reflection: AR coating) of using the interference of light by forming a plurality of layers having different refractive indexes on a substrate film; a method for mixing them, etc., exist Among them, in the case of the AG coating, the absolute amount of the reflected light is equivalent to that of a general hard coating, but a low reflection effect can be obtained by reducing the amount of light entering the eye using light scattering through irregularities. However, since the AG coating has poor screen sharpness due to the surface irregularities, many studies on AR coating have recently been conducted.

As for a film using the AR coating, a multi-layer structure in which a hard coating layer (high refractive index layer), a low reflective coating layer, and the like are laminated on a substrate film has been commercialized. However, the film using the conventional AR coating has a disadvantage that the reflectance increases at a portion damaged by rubbing, friction, or like from the outside. Accordingly, many studies have been conducted to obtain an anti-reflective film that suppresses a rise in the reflectance even if it is damaged due to external influences.

SUMMARY OF THE INVENTION

The present invention provides an anti-reflective film that effectively suppresses a rise in the reflectance due to external rubbing or friction while having good mechanical properties such as high abrasion resistance and scratch resistance and excellent optical properties.

The present invention also provides a display apparatus including the anti-reflective film and providing high screen sharpness.

The present invention provides an anti-reflective film including: a hard coating layer; and a low refractive index layer containing a binder resin containing a copolymer of a polyfunctional (meth)acrylate-based monomer, and inorganic particles dispersed in the binder resin, wherein the polyfunctional (meth)acrylate-based monomer includes a 2- to 4-functional (meth)acrylate-based monomer and a 5- to 6-functional (meth)acrylate-based monomer in a weight ratio of 9:1 to 6:4.

The present invention provides a polarizing plate including the aforementioned anti-reflective film.

In addition, the present invention provides a display apparatus including the aforementioned anti-reflective film.

DETAILED DESCRIPTION OF THE INVENTION

Hereinafter, an anti-reflective film according to a specific embodiment of the present invention and a display apparatus including the same will be described in detail.

In the present specification, the (meth)acrylate refers to including both acrylate and methacrylate.

Further, the photocurable resin collectively refers to a polymer resin polymerized by irradiation with light, for example, by irradiation with visible light or ultraviolet light.

Further, the fluorine-based compound refers to a compound containing at least one fluorine element in the compound.

According to one embodiment of the present invention, an anti-reflective film can be provided, including: a hard coating layer; and a low refractive index layer containing a binder resin containing a copolymer of a polyfunctional (meth)acrylate-based monomer, and inorganic particles dispersed in the binder resin, wherein the polyfunctional (meth)acrylate-based monomer includes a 2- to 4-functional (meth)acrylate-based monomer and a 5 to 6 functional (meth)acrylate-based monomer in a weight ratio of 9:1 to 6:4.

As a result of research by the present inventors, it was found through experiments that in the case of the anti-reflective film including a hard coating layer and a low refractive index layer in which the polyfunctional (meth)acrylate-based monomer includes a copolymer made by crosslinking polymerization of a 2- to 4-functional (meth)acrylate monomer and a 5- to 6-functional (meth)acrylate monomer in a weight ratio of 9:1 to 6:4, since the degree of crosslinking of the copolymer is increased and the free volume of the low refractive index layer including the copolymer is minimized, the physical properties such as abrasion resistance and scratch resistance can be secured while minimizing a rise in the reflectance even when rubbing or friction is applied from the outside, and furthermore, an anti-reflective film can exhibit excellent mechanical properties while enhancing the sharpness of the screen of the display apparatus, thereby completing the present invention.

The type of the polyfunctional (meth)acrylate-based monomer contained in the binder resin of the low refractive index layer may have, but is not limited to, a pentaerythritol structure or a dipentaerythritol structure at its center. For example, it may be at least one selected from the group consisting of pentaerythritol di(meth)acrylate, pentaerythritol tri(meth)acrylate, pentaerythritol tetra(meth)acrylate, dipentaerythritol tri(meth)acrylate, dipentaerythritol tetra(meth)acrylate, dipentaerythritol penta(meth)acrylate, and dipentaerythritol hexa(meth)acrylate.

Specifically, the aforementioned 2- to 4-functional (meth)acrylate-based monomer may have a pentaerythritol structure at its center, and the type thereof may include, but is not limited to, for example, pentaerythritol di(meth)acrylate, pentaerythritol tri(meth)acrylate, or a mixture thereof.

Specifically, the 2- to 4-functional (meth)acrylate-based monomer having a pentaerythritol structure at its center may be represented by the following Chemical 1.

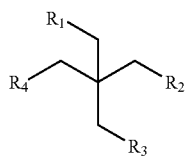
[Chemical Formula 1]

In Chemical Formula 1, $R_1$ to $R_4$ are a hydroxy group, a (meth)acrylate group, or a substituted or unsubstituted $C_{1-40}$ alkoxy group, provided that at least one of them is a (meth)acrylate group.

On the other hand, the 5- or 6-functional (meth)acrylate-based monomer may have a dipentaerythritol structure at its center, and the kind thereof may include, but is not limited to, for example, dipentaerythritol penta(meth)acrylate, dipentaerythritol hexa(meth)acrylate, or a mixture thereof.

Specifically, the 5- or 6-functional (meth)acrylate-based monomer having a dipentaerythritol structure at its center may be represented by the following Chemical Formula 2.

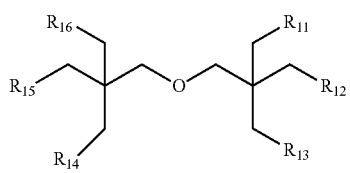
[Chemical Formula 2]

In Chemical Formula 2, $R_{11}$ to $R_{16}$ are a hydroxyl group, a (meth)acrylate group, or a substituted or unsubstituted 01-40 alkoxy group, provided that at least one of them is a (meth)acrylate group.

According to Chemical Formulas 1 and 2, since the aforementioned 2- to 4-functional (meth)acrylate-based monomer having a pentaerythritol structure has a molecular weight and a volume approximately twice that of the 5- to 6-functional (meth)acrylate-based monomer having a dipentaerythritol structure, a (meth)acrylate having a relatively large molecular weight and volume and a (meth)acrylate having a relatively small molecular weight and volume can maximize the packing density within a unit volume of the copolymer, and thus, not only can the degree of crosslinking be increased, but also the free volume can be minimized.

In particular, when the 2- to 4-functional (meth)acrylate having a pentaerythritol structure and the 5- to 6-functional (meth)acrylate having a dipentaerythritol structure are cross-linked in a weight ratio of 9:1 to 6:4, 8.5:1.5 to 6.5:3.5, or 8:2 to 7:3, the degree of crosslinking is maximized and the free volume of the binder resin containing them can be minimized.

The characteristics of the anti-reflective film according to one embodiment are in accordance with the characteristics and the like of the low refractive index layer including a copolymer made by crosslinking polymerization of the 2- to 4-functional (meth)acrylate and the 5- to 6-functional (meth) acrylate in a weight ratio of 9:1 to 6:4. As the copolymer has a high crosslinking density and minimizes the free volume of the binder resin containing the same is minimized, the modulus of the cured binder can be maximized, and thus it is possible to suppress the increase of the reflectance even if rubbing or friction is applied from the outside.

The copolymer made by crosslinking polymerization of the 2- to 4-functional (meth)acrylate and the 5- to 6-functional (meth)acrylate in a weight ratio of 9:1 to 6:4 may have a free volume within a 125 $nm^3$ volume of 420 $Å^3$ or less. When the free volume within a 125 $nm^3$ volume of the copolymer is more than 420 $Å^3$, it is impossible to prevent a rise in the reflectance due to impact strength and frictional damage of the low refractive index layer.

Further, the degree of crosslinking of the low refractive index layer containing the copolymer may be 85% or more, 85 to 99%, 90 to 99%, or 95 to 99%. If the crosslinking density is less than 85%, the reflectance of the portion where the low refractive index layer is damaged by external rubbing, friction, or the like can be increased.

The low refractive index layer may further include a portion derived from a fluorine-based compound containing a photoreactive functional group. As the binder resin of the low refractive index layer contains a fluorine-based compound containing a photoreactive functional group, it can have lower reflectivity and improved transmissivity, and further it is possible to effectively suppress an increase in the reflectance of a portion damaged by external rubbing, friction, or the like. Thus, the low refractive index layer of the anti-reflective film according to one embodiment may further include a copolymer of the polyfunctional (meth)acrylate-based monomer and a fluorine-based compound containing a photoreactive functional group.

One or more photoreactive functional groups may be contained or substituted in the fluorine-based compound containing a photoreactive functional group. The photoreactive functional group means a functional group capable of participating in the polymerization reaction by irradiation with light, for example, by irradiation with visible light or ultraviolet light. The photoreactive functional group may include various functional groups known to be capable of participating in the polymerization reaction by irradiation with light. Specific examples thereof include a (meth)acrylate group, an epoxide group, a vinyl group, and a thiol group.

The fluorine-based compound containing the photoreactive functional group may contain 1 to 60% by weight, 2 to 50% by weight, or 3 to 40% by weight of fluorine. When the content of fluorine is less than 1% by weight, the fluorine component is not sufficiently arranged on the surface of the low refractive index layer, and thus the slip property of the surface can be lowered. When the content of fluorine is more than 60% by weight, the scratch resistance of the low refractive index layer deteriorates and a rise in the reflectance due to external friction can occur.

The fluorine-based compound containing a photoreactive functional group may further contain silicon or a silicon compound. That is, the fluorine-based compound containing a photoreactive functional group can optionally contain silicon or a silicon compound therein. Specifically, the content of silicon in the fluorine-based compound containing a photoreactive functional group may be 0.1% to 20% by weight, 0.5% to 18% by weight, or 1% to 15% by weight. The silicon contained in the fluorine-based compound containing a photoreactive functional group can prevent the generation of haze on the low refractive index layer and serve to enhance transparency. On the other hand, if the content of silicon in the fluorine-based compound containing a photoreactive functional group is too large, the alkali resistance of the low refractive index layer may be lowered.

The fluorine-based compound containing a photoreactive functional group may have a weight average molecular weight (weight average molecular weight in terms of polystyrene measured by the GPC method) of 2000 to 200,000, 3000 to 180,000, or 4000 to 170,000. If the weight average molecular weight of the fluorine-based compound containing a photoreactive functional group is less than 2000, the fluorine component is not sufficiently arranged on the surface of the low refractive index layer, and thus the slip property of the surface can be lowered. Further, if the weight average molecular weight of the fluorine-based compound is more than 200,000, the scratch resistance of the low refractive index layer deteriorates and the reflectance of a portion damaged by external rubbing, friction, or the like can increase. In addition, since the compatibility between the fluorine-based compound containing a photoreactive functional group and the other components is lowered, uniform dispersion is not achieved at the time of preparing the low refractive index layer, and thus the internal structure or surface properties of the final product may be deteriorated.

Specifically, the fluorine-based compound containing the photoreactive functional group includes: i) an aliphatic compound or an aliphatic cyclic compound in which at least one photoreactive functional group is substituted and at least one fluorine is substituted for at least one carbon; ii) a heteroaliphatic compound or a heteroaliphatic cyclic compound in which at least one photoreactive functional group is substituted, at least one hydrogen is substituted with fluorine, and at least one carbon is substituted with silicon; iii) a polydialkylsiloxane-based polymer (for example, a polydimethylsiloxane-based polymer) in which at least one photoreactive functional group is substituted and at least one fluorine is substituted for at least one silicon; iv) a polyether compound in which at least one photoreactive functional group is substituted and at least one hydrogen is substituted with fluorine; or a mixture of two or more of i) to iv) or copolymers thereof.

The low refractive index layer contains 0.1 to 50 parts by weight, 0.3 to 40 parts by weight, or 0.5 to 30 parts by weight of the fluorine-based compound containing the photoreactive functional group based on 100 parts by weight of the copolymer of the polyfunctional (meth)acrylate monomer. When the content of the fluorine-based compound containing the photoreactive functional group is less than 0.1 parts by weight, the surface slip property of the low refractive index layer may be lowered, and when the content is more than 50 parts by weight, the scratch resistance may be lowered or the reflectance of a portion damaged by external rubbing, friction, or the like may increase.

On the other hand, the low refractive index layer of the anti-reflective film according to the one embodiment includes inorganic particles dispersed on the binder resin, and the inorganic particles mean inorganic particles having a diameter of a nanometer unit. Specifically, the inorganic fine particles may include solid inorganic particles and/or hollow inorganic particles.

The solid inorganic nanoparticles have a maximum diameter of 100 nm or less and refer to particles having a shape in which an empty space is not present in the inside thereof. Further, the hollow inorganic nanoparticles have a maximum diameter of 200 nm or less and refer to particles having a shape in which an empty space is present on the surfaces and/or the inside thereof.

The solid inorganic particles may have a diameter of 0.5 to 100 nm, or 1 to 50 nm. The hollow inorganic particles may have a diameter of 1 to 200 nm, or 10 to 100 nm.

On the other hand, each of the solid inorganic nanoparticles and the hollow inorganic nanoparticles may contain one or more reactive functional groups selected from the group consisting of a (meth)acrylate group, an epoxide group, a vinyl group, and a thiol group on the surface thereof. As each of the solid inorganic nanoparticles and the hollow inorganic nanoparticles contains the aforementioned reactive functional groups on the surface thereof, the low refractive index layer can have a higher degree of crosslinking, and thus it is possible to effectively suppress an increase in the reflectance of a portion damaged by external rubbing, friction, or the like, and furthermore, to further improve scratch resistance and the antifouling property.

Specific examples of the hollow inorganic particles include hollow silica particles. The hollow silica may include a predetermined functional group substituted on the surface in order to be more easily dispersed in an organic solvent. Examples of the organic functional group that can be substituted on the surface of the hollow silica particles are not particularly limited, and for example, a (meth)acrylate group, a vinyl group, a hydroxyl group, an allyl group, an epoxy group, a hydroxyl group, an isocyanate group, an amine group, fluorine, or the like may be substituted on the surface of the hollow silica.

The content of the inorganic particles may be 30 to 500 parts by weight, 40 to 400 parts by weight, or 50 to 300 parts by weight based on 100 parts by weight of the copolymer of the polyfunctional (meth)acrylate monomer. When the content of the hollow nanoparticles is less than 50 parts by weight, the refractive index of the low refractive index layer may be increased, and when the content of the hollow nanoparticles is more than 500 parts by weight, due to the decrease in the content of the binder resin, the scratch resistance characteristics may be deteriorated or the reflectance of the damage due to external rubbing or friction can be increased.

The low refractive index layer may have a refractive index of 1.2 to 1.55, 1.25 to 1.45, or 1.3 to 1.43.

On the other hand, the low refractive index layer can be obtained by coating the photocurable coating composition including a copolymer of a polyfunctional (meth)acrylate monomer and an inorganic particle onto a predetermined substrate and photo-polymerizing the coated product. The specific type and thickness of the substrate are not particularly limited, and a substrate known to be used in the production of the low refractive index layer or the anti-reflective film can be used without particular limitation.

Meanwhile, the method and apparatus commonly used for coating the photocurable coating composition can be used without particular limitation. For example, a bar coating method, such as a Meyer bar method or the like, a gravure coating method, a 2-roll reverse coating method, a vacuum slot die coating method, a 2-roll coating method, or the like can be used.

In the step of photo-polymerizing the photocurable coating composition, ultraviolet light or visible light having a wavelength of 200 nm to 400 nm can be irradiated, and the amount of exposure is preferably 100 to 4000 mJ/cm$^2$. The exposure time is not particularly limited, and can be appropriately varied depending on the exposure apparatus used, the wavelength of the irradiated light, or the amount of exposure. Further, in the step of photo-polymerizing the photocurable coating composition, nitrogen purging or the like may be performed to apply a nitrogen atmosphere condition.

The antireflection film may have an average reflectance of less than 3%, less than 2.5%, or less than 2% in the wavelength range of 380 nm to 780 nm.

On the other hand, as the hard coating layer, a hard coating layer commonly known in the art can be used without particular limitation. One example of the hard coating layer may be a hard coating layer including a binder resin containing a photocurable resin, and organic or inorganic fine particles dispersed in the binder resin.

The aforementioned low refractive index layer may be formed on one side of the hard coating layer, and an additional functional layer may be further included between the low refractive index layer and the hard coating layer.

The photocurable resin is a polymer resin polymerized by irradiation with light, for example, by irradiation with visible light or ultraviolet light as previously described, and examples thereof may include at least one selected from a reactive acrylate oligomer group consisting of a urethane acrylate oligomer, an epoxide acrylate oligomer, a polyester acrylate, and a polyether acrylate; and a polyfunctional acrylate monomer consisting of trimethylene propyl triacrylate, propoxylated glycerol triacrylate, trimethyl propane ethoxy triacrylate, 1,6-hexanediol diacrylate, propoxylated glycerol triacrylate, tripropylene glycol diacrylate, and ethylene glycol diacrylate.

The particle diameter of the organic or inorganic fine particles is not specifically limited, but for example, the organic fine particles may have a particle diameter of 1 to 10 μm, and the inorganic particles may have a particle diameter of 1 nm to 500 nm, or 1 nm to 300 nm.

In addition, specific examples of the organic or inorganic fine particles contained in the hard coating layer are not limited, but for example, the organic or inorganic fine particles may be organic fine particles composed of an acrylic-based resin, a styrene-based resin, an epoxide resin, and a nylon resin, or inorganic fine particles composed of silicon oxide, titanium dioxide, indium oxide, tin oxide, zirconium oxide, and zinc oxide.

On the other hand, as another example of the hard coat film, a hard coating layer including a binder resin of a photocurable resin and an antistatic agent dispersed in the binder resin may be mentioned.

The antistatic agent may be a quaternary ammonium salt compound, a conductive polymer, or a mixture thereof. Here, the quaternary ammonium salt compound may be a compound having at least one quaternary ammonium salt group in the molecule, and a low-molecule type or a high-molecule type can be used without limitation. Further, as the conductive polymer, a low-molecule type or a high-molecule type can be used without limitation, and the type thereof may be conventionally used in the technical field to which the present invention pertains, and thus the conductive polymer is not particularly limited.

The hard coating layer including a binder resin of the photopolymerizable resin, and an antistatic agent dispersed in the binder resin, may further include at least one compound selected from the group consisting of an alkoxysilane-based oligomer and a metal alkoxide-based oligomer.

The alkoxysilane-based compound may be one that is conventionally used in the relevant art, but preferably, it may be at least one compound selected from the group consisting of tetramethoxysilane, tetraethoxysilane, tetraisopropoxysilane, methyltrimethoxysilane, methyltriethoxysilane, methacryloxypropyl trimethoxysilane, glycidoxypropyl trimethoxysilane, and glycidoxypropyl triethoxysilane.

In addition, the metal alkoxide-based oligomer can be prepared through a sol-gel reaction of a composition including a metal alkoxide-based compound and water. The sol-gel reaction can be carried out by a method similar to the above-described method for preparing an alkoxysilane-based oligomer. However, since the metal alkoxide-based compound can rapidly react with water, the sol-gel reaction can be performed by a method of diluting the metal alkoxide-based compound in an organic solvent and then slowly dripping water thereto. At this time, considering the reaction efficiency or the like, the molar ratio (based on metal ion) of the metal alkoxide-based compound to water is preferably adjusted within the range of 3 to 170.

Herein, the metal alkoxide-based compound may be at least one compound selected from the group consisting of titanium tetra-isopropoxide, zirconium isopropoxide, and aluminum isopropoxide.

The thickness of the hard coating layer may be 0.1 to 100 μm, 2 to 95 μm, or 3 to 90 μm. When the thickness is less than 1 μm, the mechanical properties may be deteriorated, and when the thickness is more than 100 μm, the curl of the anti-reflective film becomes too severe, resulting in poor processability.

On the other hand, the anti-reflective film may further include a substrate bonded to the other surface of the hard coating layer. The substrate may be a transparent film having light transmittance of 90% or more and a haze of 1% or less. In addition, the material of the substrate may be triacetylcellulose, a cycloolefin polymer, polyacrylate, polycarbonate, polyethylene terephthalate, and the like. Further, the thickness of the substrate film may be 10 to 300 μm in consideration of productivity and the like, but is not limited thereto.

More specifically, the anti-reflective film may further include a light-transmissive substrate with retardation (Rth) in the thickness direction of 3000 nm or more, 5000 nm or more, or 5000 nm to 20,000 nm as measured at a wavelength of 400 nm to 800 nm Specific examples of such a light-transmissive substrate include a uniaxially stretched polyethylene terephthalate film and a biaxially stretched polyethylene terephthalate film.

When the anti-reflective film includes a light-transmissive substrate having retardation (Rth) in the thickness direction measured at the wavelength of 3000 nm or more, 5000 nm or more, or 5000 nm to 20,000 nm as measured at the wavelength of 400 nm to 800 nm, a rainbow phenomenon due to interference of visible rays can be reduced as compared with the case of using the retardation of 3000 nm or less.

The retardation (Rth) in the thickness direction can be confirmed by a commonly known measurement method and measurement apparatus. For example, the retardation (Rth) in the thickness direction can be determined using a measuring apparatus manufactured by AXOMETRICS, Inc. under the trade name of "AxoScan", and the like.

For example, the retardation (Rth) in the thickness direction can be determined by: inputting a value of a refractive index (589 nm) of the light-transmissive substrate film into the measuring apparatus, then measuring the thickness-direction retardation of the light-transmissive substrate film by using light at a wavelength of 590 nm under conditions of a temperature of 25° C. and humidity of 40%; and converting the measured value of the thickness-direction retardation thus determined (the value is measured according to the automatic measurement (automatic calculation) of the measuring apparatus) into a retardation value per 10 μm of thickness of the film. In addition, the size of the light-transmissive substrate as the measurement sample is not particularly limited, as long as it is larger than a light measurement unit (diameter: about 1 cm) of a stage of the measuring apparatus. However, the size may be a length of 76 mm, a width of 52 mm, and a thickness of 13 μm.

The value of the "refractive index (589 nm) of the light-transmissive substrate" utilized in the measurement of the thickness-direction retardation (Rth) can be determined by: forming an unstretched film including the same kind of resin film as the light-transmissive substrate for forming the film to be measured for the retardation, and then measuring the unstretched film as a measurement sample (in the case where the film to be measured is an unstretched film, the film can be directly used as the measurement sample) for the refractive index for light at 589 nm in an in-plane direction (the direction perpendicular to the thickness direction) of the measurement sample by using a refractive index-measuring apparatus (manufactured by Atago Co., Ltd. under the trade name of "NAR-1T SOLID") as a measuring apparatus under a light source of 589 nm and a temperature condition of 23° C.

According to another embodiment of the present invention, a polarizing plate including the anti-reflective film of one embodiment described above can be provided.

The polarizing plate may include a polarizing film and an anti-reflection film formed on at least one side of the polarizing film.

The material and the production method of the polarizing film are not particularly limited, and conventional materials and production methods known in the art can be used. For example, the polarizing film may be a polyvinyl alcohol polarizing film.

A protective film may be provided between the polarizing film and the anti-reflective film.

Examples of the protective film may include, but are not limited to, a COP (cycloolefin polymer)-based film, an acrylic-based film, a TAC (triacetylcellulose)-based film, a COC (cycloolefin copolymer)-based film, and a PNB (polynorbornene)-based film.

In the protective film, a substrate for forming a single coating layer in the production of the anti-reflective film may be used as it is.

The polarizing film and the anti-reflective film may be laminated by an adhesive such as an aqueous adhesive or a UV-curable non-aqueous adhesive.

According to another embodiment of the invention, a display apparatus including the aforementioned anti-reflective film can be provided.

Specific examples of the display apparatus are not limited, and for example, it may be a liquid crystal display (LCD), a plasma display device, or an organic light emitting diode (OLED) device.

In one example, the display apparatus includes: a pair of polarizing plates facing each other; a thin film transistor, a color filter, and a liquid crystal cell sequentially stacked between the pair of polarizing plates; and a backlight unit.

In the display apparatus, the anti-reflective film may be provided on the outermost surface at an observer side or a backlight side of the display panel.

In the display apparatus including the anti-reflective film, the anti-reflective film may be positioned on one surface of the polarizing plate relatively far from the backlight unit, among the pair of polarizing plates.

The display device may include a display panel, a polarizing film provided on at least one surface of the display panel, and an anti-reflective film provided on the opposite surface of the polarizing film making contact with the display panel.

Advantageous Effects

According to the present invention, an anti-reflective film that effectively suppresses an increase in the reflectance due to external rubbing, friction, or the like while having good mechanical properties such as high abrasion resistance and scratch resistance and excellent optical properties, a polarizing plate including the anti-reflective film, and a display apparatus including the anti-reflective film, can be provided.

DETAILED DESCRIPTION OF THE EMBODIMENTS

Hereinafter, the present invention will be described in more detail by way of examples. However, these examples are given for illustrative purposes only, and the scope of the invention is not intended to be limited to or by these examples.

Preparation Example 1: Hard Coating Layer 1

30 g of pentaerythritol triacrylate, 2.5 g of a high molecular weight copolymer (BEAMSET 371, Arakawa Corporation, Epoxy Acrylate, molecular weight: 40,000), 20 g of methyl ethyl ketone, and 0.5 g of a leveling agent (Tego wet 270) were uniformly mixed. Then, 2 g of an acrylic-styrene copolymer (volume average particle size: 2 μm, manufactured by Sekisui Plastic) with a refractive index of 1.525 as a fine particle was added to the mixture to prepare a hard coating composition.

The hard coating composition thus obtained was coated onto triacetylcellulose film with a #10 Meyer bar and dried at 90° C. for one minute. The dried product was irradiated with ultraviolet light at 150 mJ/cm$^2$ to prepare a hard coating layer having a thickness of 4 μm.

Preparation Example 2: Hard Coating Layer 2

The hard coating composition of Preparation Example 1 was coated on a PET film having a thickness of 80 μm and retardation of 10,000 nm with a #10 Meyer bar, and dried at 60° C. for one minute. The dried product was irradiated with ultraviolet rays at 150 mJ/cm$^2$ to prepare a hard coating layer having a thickness of 4 μm.

Preparation Example 3: Hard Coating Layer 3

A KYOEISHA salt type of antistatic hard coating solution (solid content: 50 wt %, product name: LJD-1000) was coated on a triacetyl cellulose film with a #10 Meyer bar, and dried at 90° C. for one minute. The dried product was then irradiated with ultraviolet rays at 150 mJ/cm$^2$ to prepare a hard coating layer having a thickness of about 5 μm.

Examples 1 to 6: Preparation of Anti-Reflective Film

Example 1

Based on 100 parts by weight of a mixed binder (weight ratio of 7:3) of pentaerythritol triacrylate (PETA) and dipentaerythritol hexaacrylate (DPHA), 100 parts by weight of hollow silica nanoparticles (diameter range: about 50 to 60 nm, manufactured by JGC Catalyst and Chemicals), 12 parts by weight of a fluorine-based compound (RS-707, DIC), and 13.4 parts by weight of an initiator (Irgacure 127, Ciba) were diluted in MIBK (methyl isobutyl ketone) solvent so that the solid content concentration became 3 wt % to prepare a photocurable coating composition.

The photocurable coating composition was coated onto the hard coat film of Preparation Example 1 in a thickness of about 110 to 120 nm with a #4 Meyer bar, and dried and cured at 60° C. for one minute to prepare an anti-reflective film. At the time of curing, ultraviolet light at 252 mJ/cm² was irradiated to the dried coating under a nitrogen purge.

Example 2

Based on 100 parts by weight of a mixed binder (weight ratio of 8:2) of pentaerythritol triacrylate (PETA) and dipentaerythritol hexaacrylate (DPHA), 184 parts by weight of hollow silica nanoparticles (diameter range: about 50 to 60 nm, manufactured by JGC Catalyst and Chemicals), 105 parts by weight of solid silica nanoparticles (diameter: about 18 nm, C784), 26 parts by weight of a fluorine-based compound (RS-907, DIC), and 31 parts by weight of an initiator (Irgacure 127, Ciba) were diluted in MIBK (methyl isobutyl ketone) solvent so that the solid content concentration became 3.5 wt % to prepare a photocurable coating composition.

An anti-reflective film was prepared in the same manner as in Example 1, except that the aforementioned photocurable coating composition was used instead of the photocurable coating composition of Example 1.

Example 3

Based on 100 parts by weight of a mixed binder (weight ratio of 7:3) of pentaerythritol triacrylate (PETA) and dipentaerythritol hexaacrylate (DPHA), 152 parts by weight of hollow silica nanoparticles (diameter range: about 50 to 60 nm, manufactured by JGC Catalyst and Chemicals), 147 parts by weight of solid silica nanoparticles (diameter: about 18 nm, C784), 14 parts by weight of a fluorine-based compound (RS-923, DIC), and 8.3 parts by weight of an initiator (Irgacure 127, Ciba) were diluted in MIBK (methyl isobutyl ketone) solvent so that the solid content concentration became 3.6 wt % to prepare a photocurable coating composition.

An anti-reflective film was prepared in the same manner as in Example 1, except that the aforementioned photocurable coating composition was used instead of the photocurable coating composition of Example 1.

Example 4

Based on 100 parts by weight of a mixed binder (weight ratio of 6:4) of pentaerythritol triacrylate (PETA) and dipentaerythritol hexaacrylate (DPHA), 142 parts by weight of hollow silica nanoparticles (diameter range: about 50 to 60 nm, manufactured by JGC Catalyst and Chemicals), 109 parts by weight of solid silica nanoparticles (diameter: about 18 nm, C784), 14.3 parts by weight of a fluorine-based compound (RS-923, DIC), and 8.3 parts by weight of an initiator (Irgacure 127, Ciba) were diluted in MIBK (methyl isobutyl ketone) solvent so that the solid content concentration became 3.2 wt % to prepare a photocurable coating composition.

The photocurable coating composition was coated onto the hard coat film of Preparation Example 2 in a thickness of about 110 to 120 nm with a #4 Meyer bar, and dried and cured at 60° C. for one minute to prepare an anti-reflective film. At the time of curing, ultraviolet light at 252 mJ/cm² was irradiated to the dried coating under a nitrogen purge.

Example 5

Based on 100 parts by weight of a mixed binder (weight ratio of 7:3) of pentaerythritol triacrylate (PETA) and dipentaerythritol hexaacrylate (DPHA), 369 parts by weight of hollow silica nanoparticles (diameter range: about 50 to 60 nm, manufactured by JGC Catalyst and Chemicals), 77 parts by weight of solid silica nanoparticles (diameter: about 18 nm, C784), 115 parts by weight of a fluorine-based compound (RS-923, DIC), and 37 parts by weight of an initiator (Irgacure 127, Ciba) were diluted in MIBK (methyl isobutyl ketone) solvent so that the solid content concentration became 2.7 wt % to prepare a photocurable coating composition.

An anti-reflective film was prepared in the same manner as in Example 4, except that the aforementioned photocurable coating composition was used instead of the photocurable coating composition of Example 4.

Example 6

Based on 100 parts by weight of a mixed binder (weight ratio of 9:1) of pentaerythritol triacrylate (PETA) and dipentaerythritol hexaacrylate (DPHA), 187 parts by weight of hollow silica nanoparticles (diameter range: about 50 to 60 nm, manufactured by JGC Catalyst and Chemicals), 43 parts by weight of solid silica nanoparticles (diameter: about 18 nm, C784), 65 parts by weight of a fluorine-based compound (RS-923, DIC), and 19.7 parts by weight of an initiator (Irgacure 127, Ciba) were diluted in MIBK (methyl isobutyl ketone) solvent so that the solid content concentration became 2.9 wt % to prepare a photocurable coating composition.

An anti-reflective film was prepared in the same manner as in Example 4, except that the aforementioned photocurable coating composition was used instead of the photocurable coating composition of Example 4.

Comparative Examples 1 to 5: Preparation of Anti-Reflective Film

Comparative Example 1

An anti-reflective film was prepared in the same manner as in Example 1, except that only pentaerythritol triacrylate (PETA) was used without using a mixed binder.

Comparative Example 2

An anti-reflective film was prepared in the same manner as in Example 2, except that pentaerythritol triacrylate (PETA) and dipentaerythritol hexaacrylate (DPHA) were mixed in a ratio of 5:5.

Comparative Example 3

An anti-reflective film was prepared in the same manner as in Example 3, except that pentaerythritol triacrylate (PETA) and dipentaerythritol hexaacrylate (DPHA) were mixed in a ratio of 3:7.

Comparative Example 4

An anti-reflective film was prepared in the same manner as in Example 4, except that pentaerythritol triacrylate (PETA) and dipentaerythritol hexaacrylate (DPHA) were mixed in a ratio of 1:9.

Comparative Example 5

An anti-reflective film was prepared in the same manner as in Example 5, except that only dipentaerythritol hexaacrylate (DPHA) was used without using a mixed binder.

EVALUATION

1. Measurement of Reflectance Rise by Rubbing

The surface of the anti-reflective film was rubbed with Briwax steel wool (#0000) under a load of 500 g and reciprocating 10 times at a rate of 27 rpm. The reflectance rise rate (change amount) was confirmed through the average reflectance measurement before and after the rubbing test. The reflectance was measured as follows. After the rubbing test of the antireflection film obtained in the above examples and comparative examples, the back side of the film was subjected to a dark color treatment, and then the reflectance mode of SolidSpec 3700 (SHIMADZU) equipment was used to measure the average reflectance in a wavelength range of 380 nm to 780 nm. The average reflectance before the rubbing test was also measured for the measurement of the change amount. The results are shown in Table 1 below.

2. Measurement of Scratch Resistance

The surface of the anti-reflective film was rubbed with a load applied steel wool (#0000) and reciprocating 10 times at a rate of 27 rpm. A maximum load at which the number of scratches (of 1 cm or less) observed by the naked eye was 1 or less was measured.

3. Measurement of Anti-Fouling Property

An anti-fouling property was measured by drawing a straight line having a length of 5 cm on surfaces of the anti-reflective films obtained in the examples and comparative examples using a black pen and confirming the number of scrubbing actions required for erasing the straight line at the time of scrubbing the anti-reflective film with a wiper.

<Measurement Standard>

○: The number of rubbing actions required for erasing the straight line was 10 or less.

Δ: The number of rubbing actions required for erasing the straight line was 11 to 20.

X: The number of rubbing actions required for erasing the straight line was more than 20.

TABLE 1

| | Average reflectance before rubbing test (%) | Average reflectance after rubbing test (%) | Average reflectance rise rate (%) | Scratch resistance(g) | Anti-fouling property |
|---|---|---|---|---|---|
| Example 1 | 1.54 | 1.6 | 0.06 | 300 | ○ |
| Example 2 | 1.52 | 1.59 | 0.07 | 500 | ○ |
| Example 3 | 1.53 | 1.54 | 0.01 | 500 | ○ |
| Example 4 | 1.49 | 1.52 | 0.03 | 500 | ○ |
| Example 5 | 0.77 | 0.8 | 0.03 | 500 | ○ |
| Example 6 | 0.93 | 0.94 | 0.01 | 500 | ○ |
| Comparative Example 1 | 1.53 | 1.75 | 0.22 | 300 | ○ |
| Comparative Example 2 | 1.52 | 1.8 | 0.28 | 500 | ○ |
| Comparative Example 3 | 1.52 | 1.82 | 0.3 | 500 | ○ |
| Comparative Example 4 | 1.5 | 1.79 | 0.29 | 500 | ○ |
| Comparative Example 5 | 0.77 | 1.01 | 0.24 | 300 | ○ |

According to Table 1, it was confirmed that the anti-reflective films of Examples 1 to 6 exhibited a reflectance rise of 0.2% or less after the rubbing test, which was excellent in the effect of suppressing the rise in reflectance due to friction, as compared with the anti-reflective films of Comparative Examples 1 to 5.

What is claimed is:

1. An anti-reflective film comprising: a hard coating layer; and
a low refractive index layer containing a binder resin containing a copolymer of a polyfunctional (meth) acrylate-based monomer, a fluorine-based compound containing a photoreactive functional group and inorganic particles dispersed in the binder resin,
wherein the inorganic particles comprise solid inorganic particles having a diameter of 0.5 to 100 nm and hollow inorganic particles having a diameter of 1 to 200 nm,
wherein the polyfunctional (meth)acrylate-based monomer includes a 2- to 4-functional (meth)acrylate-based monomer and a 5- to 6-functional (meth)acrylate-based monomer in a weight ratio of 9:1 to 8:2.

2. The anti-reflective film of claim 1, wherein the 2- to 4-functional (meth)acrylate-based monomer is pentaerythritol di(meth)acrylate, pentaerythritol tri(meth)acrylate, or a mixture thereof.

3. The anti-reflective film of claim 1, wherein the 5- to 6-functional (meth)acrylate-based monomer is dipentaerythritol penta(meth)acrylate, dipentaerythritol hexa(meth)acrylate, or a mixture thereof.

4. The anti-reflective film of claim 1, wherein the low refractive index layer includes the inorganic particles in an amount of 30 to 500 parts by weight based on 100 parts by weight of the copolymer of the polyfunctional (meth)acrylate-based monomer.

5. The anti-reflective film of claim 1, wherein the low refractive index layer has a refractive index of 1.2 to 1.55.

6. The anti-reflective film of claim 1, wherein the low refractive index layer has a degree of crosslinking of 85% or more.

7. The anti-reflective film of claim 1, wherein the hard coating layer includes a binder resin containing a photocurable resin, and organic or inorganic fine particles dispersed in the binder resin.

8. The anti-reflective film of claim 1, wherein the hard coating layer has a thickness of 1 to 100 μm.

9. The anti-reflective film of claim 1, wherein the anti-reflective film has an average reflectance of less than 3% in a wavelength region of 380 nm to 780 nm.

10. The anti-reflective film of claim 1, further comprising a light-transmissive substrate having retardation (Rth) in a thickness direction of 3000 nm or more as measured at a wavelength of 400 nm to 800 nm.

11. A polarizing plate comprising the anti-reflective film of claim 1.

12. A display apparatus comprising the anti-reflective film of claim 1.

13. The anti-reflective film of claim 1, wherein the photoreactive functional group includes a (meth)acrylate group, an epoxide group, a vinyl group, a thiol group or a mixture thereof.

\* \* \* \* \*